United States Patent
Ramanathan et al.

(10) Patent No.: US 11,184,371 B1
(45) Date of Patent: *Nov. 23, 2021

(54) DISTRIBUTED DENIAL OF SERVICE ATTACK MITIGATION

(71) Applicant: Wells Fargo Bank, N.A., San Francisco, CA (US)

(72) Inventors: Ramanathan Ramanathan, Bellevue, WA (US); Ajay K. Rentala, Hyderabad (IN); Rama Rao Yadlapalli, Hyderabad (IN); Vamsi K. Geda, Hyderabad (IN); Rameshchandra Bhaskar Ketharaju, Hyderabad (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,417

(22) Filed: Jun. 5, 2020

Related U.S. Application Data

(63) Continuation of application No. 15/856,200, filed on Dec. 28, 2017, now Pat. No. 10,715,535.

(60) Provisional application No. 62/440,803, filed on Dec. 30, 2016.

(51) Int. Cl.
  *H04L 29/06* (2006.01)
(52) U.S. Cl.
  CPC ...... *H04L 63/1416* (2013.01); *H04L 63/1458* (2013.01); *H04L 63/1483* (2013.01)
(58) Field of Classification Search
  CPC ............. H04L 63/1416; H04L 63/1458; H04L 63/1483
  USPC ......................................................... 726/23
  See application file for complete search history.

(56) References Cited

U.S. PATENT DOCUMENTS

| | | | |
|---|---|---|---|
| 7,171,688 | B2 | 1/2007 | Boom |
| 7,337,315 | B2 | 2/2008 | Micali |
| 7,424,741 | B1 | 9/2008 | Grimm et al. |
| 7,463,590 | B2 | 12/2008 | Mualem et al. |
| 7,472,416 | B2 | 12/2008 | Ramaiah et al. |
| 7,660,993 | B2 | 2/2010 | Birrell et al. |
| 8,272,044 | B2 * | 9/2012 | Ansari ............... H04L 63/1458 726/13 |
| 8,769,129 | B2 | 7/2014 | Watsen et al. |

(Continued)

OTHER PUBLICATIONS

Shashikala and C. Kavitha, "A secured alternative path routing protocol against DoS attack," 2014 Eleventh International Conference on Wireless and Optical Communications Networks (WOCN), Vijayawada, India, 2014, pp. 1-5, doi: 10.1109/WOCN.2014.6923046. (Year: 2014).*

(Continued)

*Primary Examiner* — Kambiz Zand
*Assistant Examiner* — Aubrey H Wyszynski
(74) *Attorney, Agent, or Firm* — Kilpatrick Townsend & Stockton LLP

(57) ABSTRACT

Provided herein are identification of a distributed denial of service attack and automatic implementation of preventive measures to halt the distributed denial of service attack. At substantially the same time as the attack, valid users/customers (e.g., devices) are provided quality of service and continued access to a website experiencing the distributed denial of service attack. Further, service to temporary or unknown users (e.g., devices) with public access to the website is suspended during the duration of the distributed denial of service attack.

20 Claims, 9 Drawing Sheets

(56) References Cited

U.S. PATENT DOCUMENTS

| | | | |
|---|---|---|---|
| 9,015,469 | B2 | 4/2015 | Prince et al. |
| 9,043,602 | B1 | 5/2015 | Krieger et al. |
| 9,049,247 | B2 | 6/2015 | Holloway et al. |
| 9,338,143 | B2 * | 5/2016 | Hansen ............... H04L 63/145 |
| 10,530,803 | B1 * | 1/2020 | Palle ..................... H04L 63/10 |
| 10,715,535 | B1 * | 7/2020 | Ramanathan ...... H04L 63/1483 |
| 2002/0116611 | A1 | 8/2002 | Zhou et al. |
| 2004/0015413 | A1 * | 1/2004 | Abu-Hejleh ........... G06Q 20/04 705/26.44 |
| 2006/0015904 | A1 * | 1/2006 | Marcus ............... H04N 21/254 725/46 |
| 2008/0254765 | A1 * | 10/2008 | Eliaz ..................... G06Q 20/18 455/406 |
| 2009/0282457 | A1 | 11/2009 | Govindavajhala |
| 2010/0138921 | A1 | 6/2010 | Na et al. |
| 2010/0299398 | A1 * | 11/2010 | Nagoya ................ H04L 69/12 709/206 |
| 2014/0115340 | A1 | 4/2014 | Lee |
| 2014/0325220 | A1 | 10/2014 | Tunnell et al. |
| 2016/0021136 | A1 | 1/2016 | McGloin et al. |

OTHER PUBLICATIONS

Yan Shen et al., A two-level source address spoofing prevention based on automatic signature and verification mechanism, Proceedings of the International Symposium on Computers and Communications, Aug. 2008, pp. 392-397.

Emin Topalovic et al., Towards Short-Lived Certificates, Proceedings of the IEEE CS Security and Privacy Workshops, May 2012, 9 pages.

* cited by examiner

DISTRIBUTED DENIAL OF SERVICE ATTACK MITIGATION

CROSS-REFERENCE TO RELATED APPLICATIONS

This application is a continuation of U.S. patent application Ser. No. 15/856,200, filed Dec. 28, 2017, entitled "Distributed Denial of Service Attack Mitigation," and now U.S. Pat. No. 10,715,535, which claims the benefit of U.S. Provisional Patent Application No. 62/440,803, filed on Dec. 30, 2016, and entitled "Distributed Denial of Service Attack Mitigation." The entireties of these applications are incorporated herein by reference.

BACKGROUND

With the prevalence of computing devices and online services, the occurrence of denial of service attacks may be experienced. These attacks attempt to make a computing device, or a network resource, unavailable for its legitimate users. The unavailability may be temporary or, in some cases, may be permanent. In a distributed denial of service attack, there is more than one source of the attack, and may include hundreds of sources, each having a unique Internet Protocol address. On the user side, denial of service attacks have been blamed for user dissatisfaction. On the network side, a denial of service attack compromises the integrity of the system and negatively influences the customer experience.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The various aspects provided herein are related to mitigation of distributed denial of service attacks. An aspect relates to a system that includes a processor and a memory that stores executable instructions that, when executed by the processor, facilitate performance of operations. The operations include determining a presence of a unique code or unique key (in the form of a digital certificate or hexadecimal number or hash key) on a device accessing an online session of an identified website. The code is linked to the identified website. Based on a determination that the code is present on the device, the operations include deactivating a deny access flag for the identified website and launching the identified website through a secure shell. Alternatively, based on a determination that the code is not present on the device, the operations include issuing a temporary token with a predefined validity time and launching the identified website through another secure shell during the predefined validity time. The secure shell is a secure communications connection established between the device and the identified website.

In an example, determining the presence of the code comprises determining if the code is installed on the device. The presence of the code indicates the device is associated with an identity of a validated user. The code may be present on the device as a digital certificate issued during a registration process with the identified website. Alternatively, the code may be present on the device as a text file with the unique code has value or in the form of a registry key issued during a registration process with the identified website.

Lack of the code indicates the device is associated with an identity of an unknown user. For the temporary token, after expiration of the predefined validity time, a connection between the device and the identified website is disabled.

In some implementations, the operations include updating the device with a server address of the identified website periodically during the online session. Further to this implementation, the updating is through a secure push model.

According to other implementations, the operations include determining an identified website is undergoing a distributed denial of service attack. Further, the operations include, based on a determination that the code is not present on the device, activating a deny access flag of the device for access to the identified website. Access to the identified website by the device is prevented during the distributed denial of service attack.

Another aspect relates to a method that includes determining, by a system comprising a processor, an identified website is undergoing a distributed denial of service attack. Based on a determination that a code linked to the identified website is installed on a first device accessing an online session of the identified website during the distributed denial of service attack, the method includes deactivating, by the system, a deny access flag of the first device for access to the identified website. The identified website may be launched, by the system, through a secure shell. The first device accesses the identified website during the distributed denial of service attack. Based on another determination that another code linked to the identified website is not installed on a second device accessing another online session of the identified website during the distributed denial of service attack, the method includes activating, by the system, a deny access flag of the second device for access to the identified website. Access to the identified website to the second device is prevented during the distributed denial of service attack.

In an example, the secure shell is a secure communication channel between the first device and the identified website. The code linked to the identified website is installed on the first device during a registration process with the identified website. The code may be a digital certificate issued during a registration process with the identified website. Alternatively, the code may be a text file issued during a registration process with the identified website. The first device comprises an identification of a user independently verified by the identified website and the second device comprises another identification of an unverified user.

A further aspect relates to a computer-readable storage device that stores executable instructions that, in response to execution, cause a system comprising a processor to perform operations. The operations include determining a presence of a code linked to an identified website on a device accessing an online session of the identified website. Based on a determination that the code is present on the device, the operations include deactivating a deny access flag for the identified website and launching the identified website through a secure shell. Alternatively or additionally, based on a determination that the code is not present on the device (or another device), the operations include issuing a temporary token with a predefined validity time and launching the identified website through the secure shell during the predefined validity time. The secure shell is secure communication connection between the device and the identified website.

Further to this aspect, the operations may include determining an identified website is undergoing a distributed denial of service attack. Based on a determination that the code is not present on the device, the operations include activating a deny access flag of the device for access to the identified website. Access to the identified website is prevented to the device during the distributed denial of service attack.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
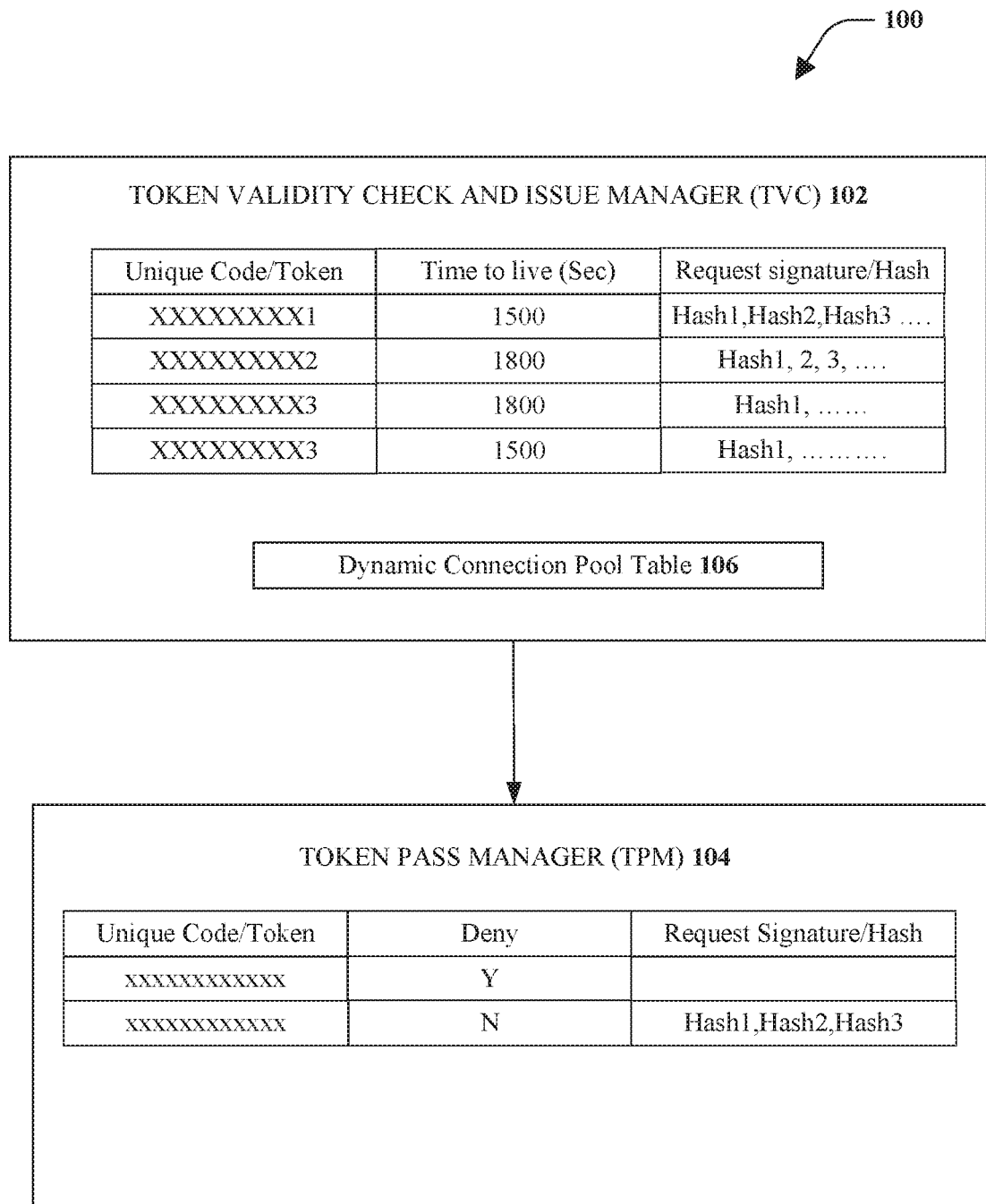
FIG. 1 illustrates an example, non-limiting representation of portions of a distributed denial of service mitigation system, according to an aspect.

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

Various aspects described herein relate to mitigation of distributed denial of service (DDoS) attacks. Although there have been attempts to increase cyber security, work on recovering from the long-term damages of DDoS on an entity's website has not been addressed and there is no effective and specific protocol for protection. The aspects provided herein mitigate DDoS attacks by allowing known and trusted devices to access a website through a secure shell (e.g. a secure connection) at the time of the DDoS attack.

A DDoS attack is a malicious attempt to make a server or network resource unavailable to users. This may be achieved by temporarily interrupting or suspending the services of a host connected to the Internet. A denial of service is where the attack source is more than one (and sometimes hundreds or thousands) of unique IP address. A denial of service attack may be characterized by an explicit attempt by attackers to prevent legitimate users of a service from using that service. There are two general forms of denial of service attacks: those that crash services and those that flood services. The most serious attacks are distributed and in many cases involve forging of IP sender addresses (e.g., IP address spoofing) so that the location of the attacking machines might not easily be determined and, therefore, filtering is not possible based on the source address.

A DDoS attack occurs when multiple systems flood the bandwidth or resources of a targeted system, usually one or more web servers. Such an attack is often the result of multiple compromised systems (e.g., a botnet) flooding the targeted system with traffic. When a server is overloaded with connections, new connections may no longer be accepted. The major advantages to an attacker of using a distributed denial-of-service attack are that multiple machines may generate more attack traffic than one machine, multiple attack machines are harder to turn off than one attack machine, and the behavior of each attack machine may be stealthier, making it harder to track and shut down. These attacker advantages cause challenges for defense mechanisms. For example, merely purchasing more incoming bandwidth than the current volume of the attack might not help because the attacker might be able to simply add more attack machines. In addition, malwares may carry DDoS attack mechanisms. For example, in at least one situation a target website's DDoS mechanism was triggered on a specific date and time. This type of DDoS involves hardcoding the target IP address prior to release of the malware and no further interaction is necessary to launch the attack.

Further, a system may also be compromised with a Trojan, allowing the attacker to download a zombie agent, or the Trojan may contain the zombie agent. Attackers may also break into systems using automated tools that exploit flaws in programs that listen for connections from remote hosts. This scenario primarily concerns systems acting as servers on the web. In some cases, a machine may become part of a DDoS attack with the owner's consent.

The means to carry out sophisticated and effective attacks are within easy reach of anyone with a personal computer and an Internet connection. Do-it-yourself DDoS attack tools are readily available and easy to use. Botnets for rent and DDoS attack services are available to anyone willing to pay a little amount of money. A quick search on the internet shows how openly these attack services are being sold. As a result, enterprises and service providers are experiencing attacks on their servers and data centers more often and with more severe business consequences than ever before. The primary goal of the attacker in most cases is to prevent a data center from performing its core function—whether that relates to transacting e-commerce; delivering e-mail or voice services; providing DNS services; serving up Web content delivery; hosting games; and so on. Because the attacker is trying to create maximum disruption, attacks are most likely to occur at the worst possible time for the victim. For example, online retailers are especially vulnerable during a peak shopping period, such as the end of year holiday season.

As methods of DDoS attacks increase in sophistication, frequency, and severity, security solutions need to meet and surpass these threats. FIG. 1 illustrates an example, non-limiting representation of portions of a DDoS mitigation system 100, according to an aspect. The system 100, as well as the other aspects disclosed herein, provides identification of a DDoS attack and automatic implementation of preventive measures to halt the DDoS attack. At substantially the same time as the attack, valid users/customers (e.g., devices) are provided quality of service and continued access, while service to temporary or unknown users (e.g., devices) with public access is suspended.

The portions of the illustrated system 100 include a token validity and issue manager (TVC) portion 102 and a token pass manager (TPM) portion 104. The TVC portion 102 and TPM portion 104 may be included in a clustered system with an auto-failover mechanism. The system 100 may be implemented on a computing device or an appliance that carries out the various aspects discussed herein.

A device may also be called, and may contain some or all of the functionality of a system, subscriber unit, subscriber station, mobile station, mobile, mobile device, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects may also be implemented with wired devices, or with both wired and wireless devices.

The TVC portion 102 may be configured to issue and/or validate tokens received from devices attempting to access, or accessing, an identified website. Each device may be associated with an identity of a user (e.g., customer of an entity associated with the identified website). During an initial registration process, each user that opts into online banking (or another secure website access) or becomes a customer is issued a unique token. The unique token may be in the form of a unique code, a cookie, a digital certificate per device, and so on. Further, the registration process may be a one-time activity.

The following will describe a first example scenario in which a client (e.g., user or customer) request is received and the client has a valid unique token. Upon successful validation, the TVC portion 102 applies an internal algorithm and generates a unique code for all connections with valid tokens. The request is conveyed to the TPM portion 104.

The TPM portion 104 maintains a whitelist that may include at least two entries: one entry for connections that have a unique token and passed the validity check and another entry for temporary connection codes. In the list, there is also a field for whether to deny the access. The deny access flag may be set to "N" or "no" for connection codes that have a unique code from registered devices. Further, the deny access flag may be set to "Y" or "yes" or to "N" for temporary connections accessing publicly available information. The TPM portion 104 may allow connections to the identified website upon successful validity checks, which may include a DDoS determination check.

A second example relates to a public connection request (e.g., a non-customer). The TVC portion 102 may issue a temporary token with a predefined validity time (e.g., 30 minutes) to the client. A dynamic "connection pool table" is maintained. The connection pool table may include a predefined size to allow only a determined number of connections per second.

The dynamic connection pool table 106 maintains all the unique codes of temporary tokens. Further, the connection pool table 106 may track a "time to live" flag that records the time and invalidates connects when the time expires.

The TVC portion 102 generates a single code for all connections with temporary tokens and passes the information to the TPM portion 104. The deny flag is set to "N." The TPM portion 104 allows connections to the actual on-line banking facility upon successful validity checks including DDoS determination check.

Further to this example, a time to live determination may include precollecting the IP addresses of the devices connected (clients and servers). The devices may also be Internet of Things (IoT) devices of the customers/valid users (trusted certificates). At about the same time as the IP address is determined, the TVC portion 102 may ping (e.g., send an electronic communication) to the contacting device/service/client requesting a response. Based on the latency of the response, the TVC portion 102 may allocated the time to live, which may be expressed in seconds according to an aspect.

A third example relates to a potential DDoS Attack. The TVC portion 102 may maintain a connection pool table that actively rejects connections when a size of the connection pool table exceeds a predetermined pool size of table that have no permanent unique tokens that generally has a pattern to quickly identify and validate. Any connection that comes with a permanent unique token is from a valid customer and unique to device and thus reduces overhead on the TVC portion 102 to generate any temporary time bound unique code coming from non-registered customers. The TPM portion 104 allows connections to the actual on-line banking facility upon successful validity checks including DDoS determination check.

A fourth example relates to a TVC failure. When the TVC portion 102 fails, the TPM portion 104 takes over the role of the TVC portion 102. Thus, the TPM portion 104 performs its functions and the functions of the TVC portion 102. In this situation, the TPM portion 104 suspends ticket generation process by updating its deny flag to 'Y' for all connections except the connections that have permanent unique code. The TPM portion 104 allows connections to the actual on-line banking facility upon successful validity checks including DDoS determination check.

According to some aspects for the DDoS determination, a hash value is generated for each request from customers using the token and URL. The hash value is stored at the TVC portion 102. The TVC portion 102 analyzes the previous hash values and if the previous hash values match for more than a preconfigured threshold value (e.g., about 10), then it may indicate the customer/device is invoking the same URL again and again (an indication that it might be a DDoS attack). In this situation, the TVC portion 102 would check if there is a permanent unique token (e.g., in the form of a secure cookie or a digital certificate) associated with this client device and removes it, and issues the client a temporary time bound unique token before forwarding the request to the TPM portion 104 with a temporary code. When the website is under DDoS attack, deny flag would be set to "Y" and the connection with the temporary code would be dropped or terminated.

Figure 2:
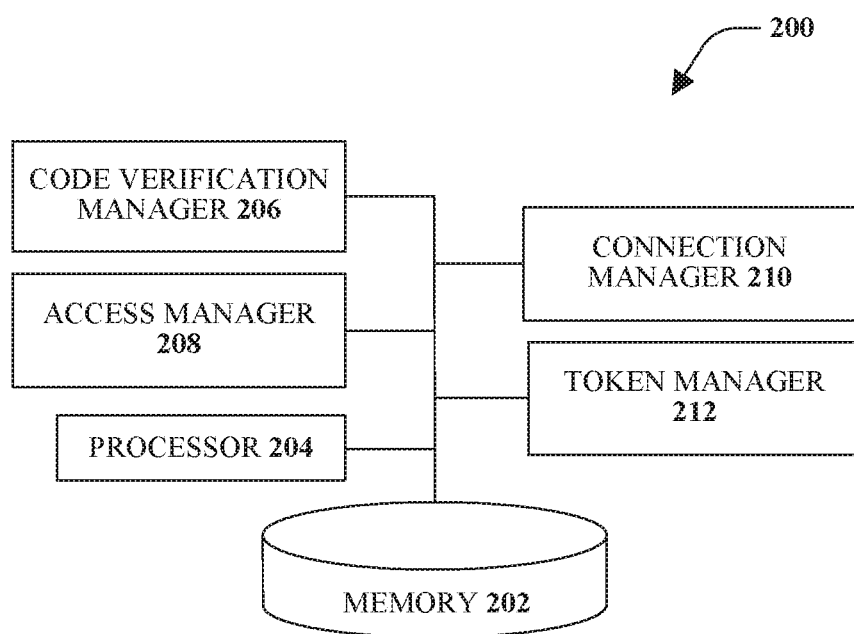
FIG. 2 illustrates an example, non-limiting system configured for distributed denial of service attack mitigation, according to an aspect.

In further detail, FIG. 2 illustrates an example, non-limiting system 200 configured for distributed denial of service attack mitigation, according to an aspect. As discussed herein, the various aspects may be configured to provide the necessary level of defense for network systems by proposing a dynamic real-time DDoS security solution. The various aspects may be based on adaptive behavioral-based and signature-based technologies and may defend against both network and application-level attacks, delivering a holistic approach to DDoS attacks by introducing a 'shell' for trusted customers or users. The various aspects provide a cyber security system capable of DDoS (distributed denial of service) attack mitigation.

The system 200 may include at least one memory 202 that may store computer executable components and/or computer executable instructions. The system 200 may also include at least one processor 204, communicatively coupled to the at least one memory 202. The at least one processor 204 may facilitate execution of the computer executable components and/or the computer executable instructions stored in the at least one memory 202. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 202 (e.g., operatively connected to the at least one memory 202), the various aspects are not limited to this implementation. Instead, in accordance with various implementations, the one or more computer executable components and/or the one or more computer executable instructions may be stored in (or integrated within) the at least one memory 202. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system 200 may include a code verification manager 206 that may be configured to determine a presence of a code embedded on a device that is accessing an online session of an identified website. The code may be referred to as a security code, an embedded code, and so on. The code is linked to (or associated with) the identified website. To obtain the code, the device was previously utilized to authenticate with the identified website.

If the code verification manager 206 determines the code is embedded on the device, an access manager 208 may be configured to deactivate a deny access flag for the identified website. Further, a connection manager 210 may be configured to launch the identified website through a secure shell based on the presence of the code. As used herein a secure shell is a secure connection established between the device and the identified website.

If the code verification manager 206 determines the code is not embedded on the device, a token manager 212 may be configured to issue a temporary token to the device. The temporary token may be effective for a predefined validity time. During pendency of the predefined validity time (e.g., the period has not lapsed), the connection manager 210 may be configured to launch the identified website through a secure shell. After expiration of the predefined validity time, access to the identified website by the device is disabled. Further, if the website experiences a DDoS attack, access by the device without the secure code is automatically disabled, while devices with the secure code are allowed to establish, or continue, access with the website.

Figure 3:
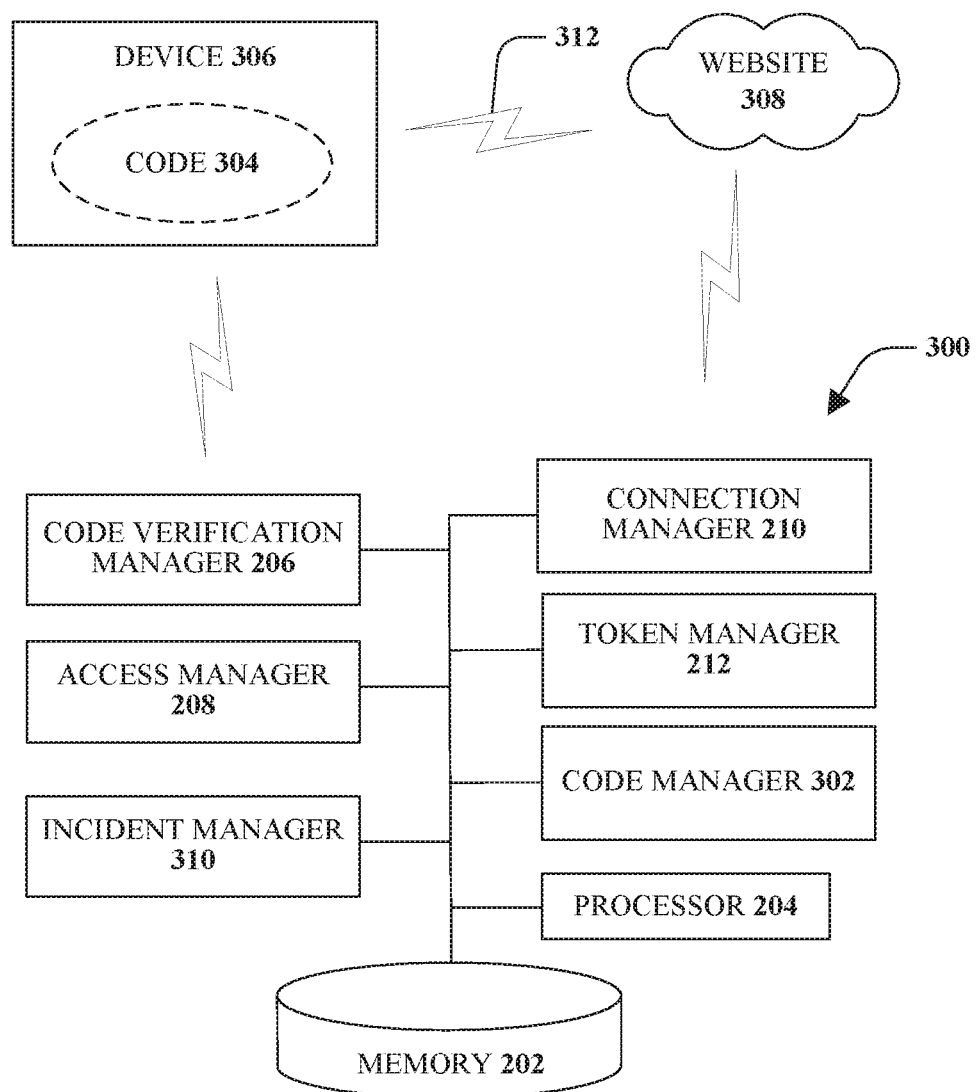
FIG. 3 illustrates an example, non-limiting system configured to allow trusted devices continued access to an identified website during a distributed denial of service attack, according to an aspect.

FIG. 3 illustrates an example, non-limiting system 300 configured to allow trusted devices continued access to an identified website during a distributed denial of service attack, according to an aspect. Included in the system 300 is a code manager 302 that may be configured to provide a secure code 304 to a device 306 that has authenticated with a website 308 (e.g., a website server). The device 306 may authenticate with the website 308 through various authentication techniques including, for example, registering a first time with the website 308 by providing identifying information. The identifying information may be utilized by the website 308 (e.g., one or more servers that operate the website) to determine the device 306 is being utilized by a user that has been identified and is authorized to utilize the website 308. As utilized herein a user, client, customer, entity, or the like, may refer to a human, an actor, a computer, the Internet, a system (or another system), a commercial enterprise, a computer, a machine, machinery, and so forth, hereinafter referred to as a user, a client, and/or an entity, depending on the context.

The website 308 may be associated with any type of entity that utilizes a website (e.g., a collection of related web pages, usually identified with a common domain name such as "companyname.com," "collegename.edu," "charity.org," and so on). As used herein an "entity" refers to an organization (e.g., company, charity, educational institution, government entity, a sole proprietorship, an individual, and so on), persons operating on behalf of the organization, and/or communication devices managed by the organization and/or the persons operating on behalf of the organization. Additionally or alternatively, the entity may be a third party monitoring source or another type of entity that has a trusted relationship with the entity.

The website 308 may be a secure website, an unsecure website, or combinations thereof. For example, a first web page of the website may be "unsecure" and provides information about a company's history. A subsequent web page of the website may be "secure" and provides an opportunity for a user browsing the website to purchase an item from the company. A "secure" website (or portions thereof) relates to security (e.g., encryption) that is applied to data passing between a server(s) of the website and a user device (e.g., device browser).

As utilized herein a user, client, customer, operator, or the like, may refer to a human, an actor, a computer, the Internet, a system (or another system), a commercial enterprise, a computer, a machine, machinery, and so forth, hereinafter referred to as a user, a client, and/or an operator, depending on the context. The user may be browsing a website(s) for a legitimate purpose (e.g., is a customer of the entity, is interested in the entity, works for the entity, is performing research, and so on). However, in some instances, the user may be a rogue user attempting to disrupt activities associated with the website (e.g., a DDoS attack).

According to an implementation, at about the same time as the device 306 is authenticated with the website server, the code manager 302 provides the code 304. The authentication may be based upon registering with the website 308. For example, a customer may establish an account with an organization and may access a website (or secure portions thereof) of the organization based on the account. The registration may be through various means and may be a one-time process. The code 304 may be a token, which may be a hardware token provided to the device (e.g., the user) in various ways including, for example, a USB drive, a key fob, and so on. In some implementations, the secure code 304 or token may be a soft token provided to the device 306 through e-mail, for example. The secure code 304 is associated with the website 308 (e.g., is not intended to be used to access other websites) for legitimate purposes only.

While the device 306 is browsing the website 308, the website 308 may experience an attack, which may be determined or detected by an incident manager 310. According to some implementations, the attack may be a DDoS attack. However, the disclosed aspects may be utilized with other types of attacks. In one example, the incident manager 310 may determine that a number of hits on the website 308 exceed a threshold level. For example, based on historical data it may be determined that x number of hits has been the maximum number of hits on the website. Therefore, the threshold level may be x+y number of hits (where x and y are integers) and, a number of hits to the website that meets or exceeds that level indicates a DDoS attack.

During the attack and/or at other times, the code verification manager 206 may be configured to determine if the code 304 is embedded on the device 306. For example, if the device was previously authenticated and the code manager 302 provided the secure code 304, the secure code 304 would be embedded on the device 306 and the code verification manager 206 acknowledges the code 304.

If an attack is detected by the incident manager 310 and the code verification manager 206 determined the code 304 is embedded on the device 306, the connection manager 210 may be configured to deactivate a deny access flag of the device 306. The deny access flag is an indication utilized by the website 308 (e.g., website server) to determine if access to the website should be denied to a device. By deactivating the deny access flag, it indicates that access is allowed. Therefore, the connection manager 210 may launch the website 308 through a secure shell 312, or may continue to allow access though the secure shell during the DDoS attack. As mentioned, the secure shell 312 is a secure connection established between the device 306 and the website 308.

Therefore, the device 306 is able to access (or continue to access) the website 308 during an attack on the website 308. Traditionally, during the time of an attack (e.g., a DDoS attack), the website goes down and no one, even genuine or trusted customers, are able to access the website during that period, resulting in customer dissatisfaction and loss of business. The disclosed aspects, however, allow existing or known customers and other trusted users access to the website through the shell 312 during the attack.

Figure 4:
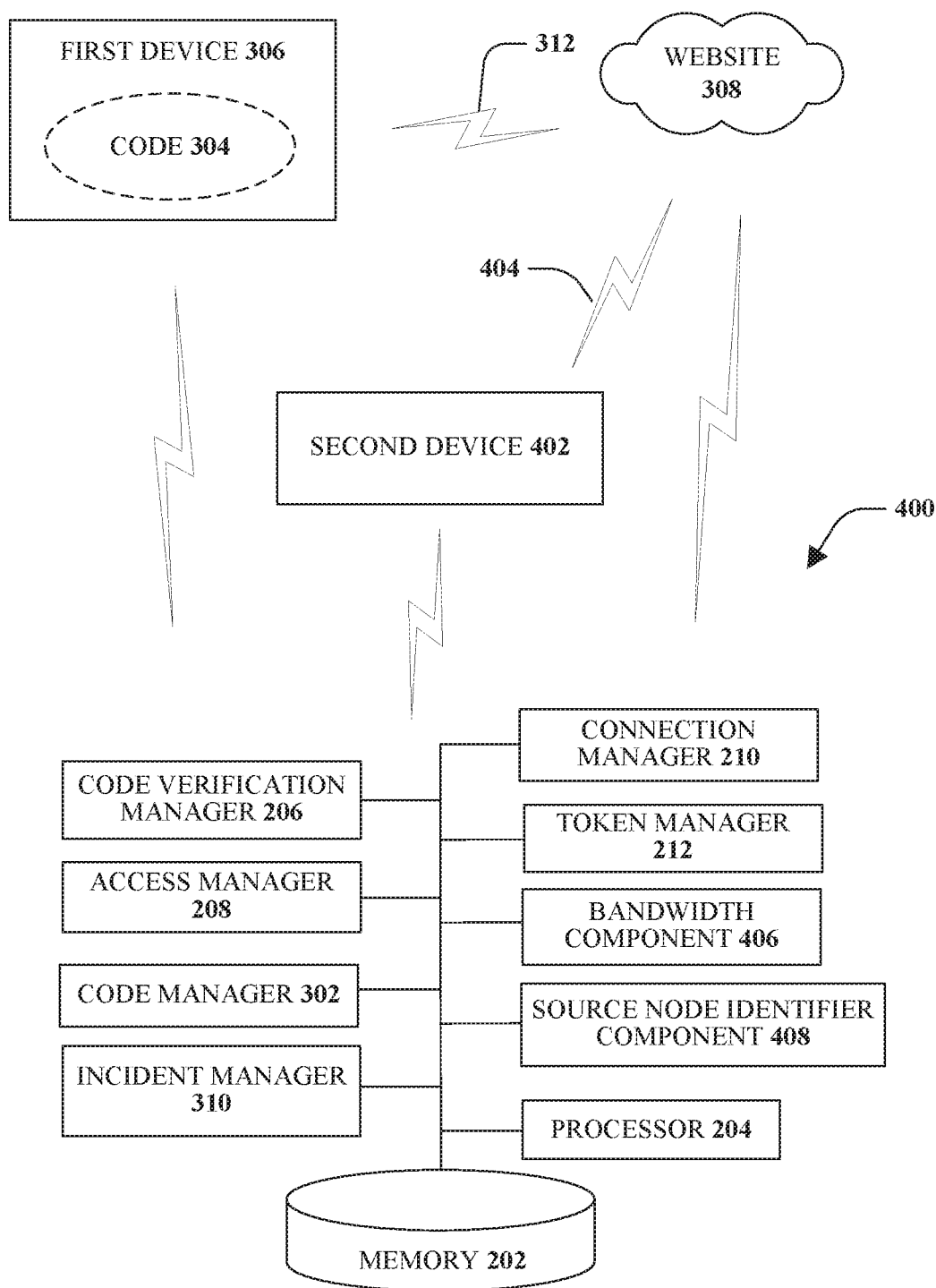
FIG. 4 illustrates an example, non-limiting system configured for denying unknown devices initial access, or continued access, to an identified website during a distributed denial of service attack, according to an aspect.

FIG. 4 illustrates an example, non-limiting system 400 configured for denying unknown devices initial access, or continued access to an identified website during a distributed denial of service attack, according to an aspect. The system may include another device 402 (second device) that is accessing the website 308 at substantially the same time as the device 306 (first device) or at another time. The second device 402 has not registered with the website 308. Therefore, the second device 402 may be operated by a user that is browsing the website for various purposes (e.g., researching the organization associated with the website, looking for information, and so on). In some cases, the second device 402 (as well as other devices, including the first device 306) may be a device that is being utilized to attack the website 308.

If the website 308 is not undergoing a DDoS attack, the token manager 212 may issue a temporary token to the second device 402. The temporary token has a predefined validity time, after which the temporary token is revoked. During pendency of the validity time, the connection manager 210 may launch the website 308 through another secure shell 404, allowing the second device 402 to interact with the website 308.

During the interaction or when a connection is attempted, the website 308 may experience an attack, such as a DDoS attack or another type of attack. A bandwidth component 406 may be configured to evaluate connections to the website 308 and make a determination whether a potential attack is in process.

For example, the bandwidth component 406 may evaluate a number of devices attempting to access the website, as well as the number of devices in an active session with the website. If the total number of devices is more than a threshold number, it may indicate a potential attack.

The threshold number may be determined by the bandwidth component 406 based on historical data. For example, over time the number of devices accessing/attempting to access the website may be observed and retained. Further, information related to time, day, or other circumstances may be retained. In one example, a number of devices accessing/attempting to access the website may peak on certain days/time, during promotional events, during seasonal events, at certain times of the year, and so on. Thus, the threshold number may be different for different circumstances surrounding the access/access attempts.

According to some implementations, a potential attack on the website may be determined by a source node identifier component 408. The source node identifier component 408 may be configured to identify each node (e.g., device) that is accessing/attempting to access the website. Further, the source node identifier component 408 may be configured to determine if one or more source nodes are attempting to repeatedly access the website.

For example, one or more configurable rules may be established that identify criteria for a determination that a DDoS attack is in process. For example, a rule may be established that indicates that if out of n number of connections m are for the same URL, where n and m are integers and m<n it indicates a DDoS attack is in process. Thus, if n=10 and m=5, then at substantially the same time as the fifth attempt is received from the same URL, an indication is output that the website is under a DDoS attack.

In some implementations, the determination may be made based on a percentage of the requests coming from a single URL. For example, a configurable rule may be established that if p % of the n requests are from a single node, where p is an integer, then the website is under attack.

According to some implementations, a trusted device may be the device from which the DDoS attack is being implemented (or at least a portion of the DDoS attack). This may be due to the trusted device being compromised (e.g., hacked by a rogue user) and the trusted user of the device is not aware that the device is being used for the attack, or based on another reason why the trusted device is a source of the DDoS attack. Accordingly, the determination by the source node identifier component 408 is made regardless of the device identified.

Based on a determination that the website is undergoing a DDoS attack, a deny access flag of the second device 402 is set to Y ("Yes"). Based on this setting, access to the identified website by the second device 402 is denied (e.g., the access is terminated, the secure shell is disconnected, and so on).

The second device 402 may attempt another connection to the website. If the website is still undergoing the DDoS attempt, access to the website is continued to be denied for the second device 402. However, if the website is no longer undergoing the DDoS attack, a temporary token is issued and the device is allowed access via the secure shell 404.

Thus, if a DDoS attack is in process, any subsequent requests from devices that do not have an embedded code will be dropped for an identified period of time (e.g., 10 minutes, 1 hour, 12 hours, 24 hours, and so on), or after the DDoS attack is over. The reasons to drop subsequent requests from devices not having the unique code is to prevent bots (e.g., robots or a program that operates on an automated basis) from repeatedly pinging the website.

Figure 5:
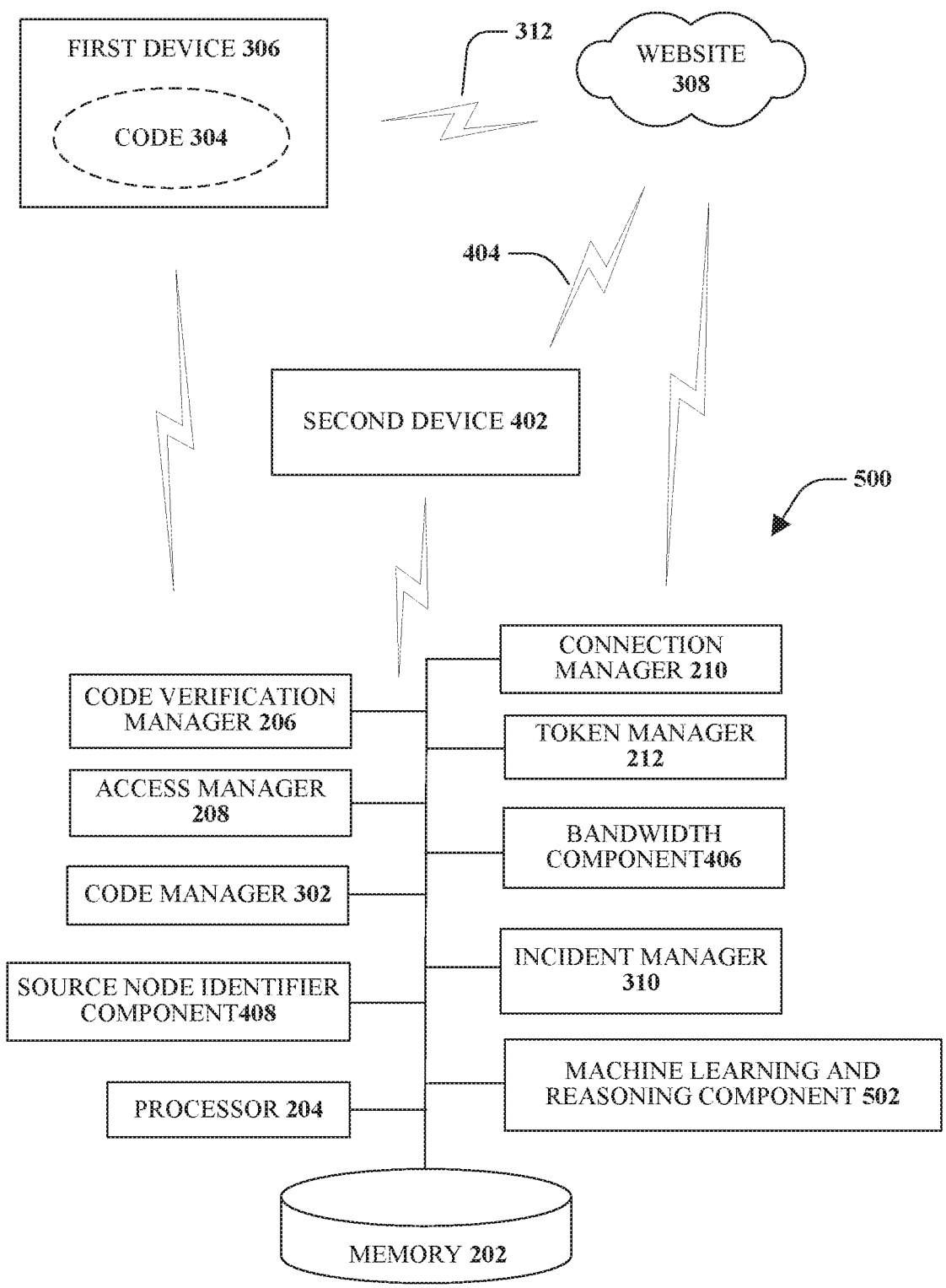
FIG. 5 illustrates an example, non-limiting system that employs automated learning to facilitate one or more of the disclosed aspects.

FIG. 5 illustrates an example, non-limiting system 500 that employs automated learning to facilitate one or more of the disclosed aspects. For example, a machine learning and reasoning component 502 may be utilized to automate one or more of the disclosed aspects. The machine learning and reasoning component 502 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 may employ principles of probabilistic and decision theoretic inference. Additionally or alternatively, the machine learning and reasoning component 502 may rely on predictive models constructed using machine learning and/or automated learning procedures. Logic-centric inference may also be employed separately or in conjunction with probabilistic methods.

The machine learning and reasoning component 502 may infer how connecting devices should be handled in a DDoS situation. Based on this knowledge, the machine learning and reasoning component 502 may make an inference based on whether a secure code should be issued to a device, whether a device should be issued a temporary code, whether a situation indicates a potential DDoS attack, and so on.

As used herein, the term "inference" refers generally to the process of reasoning about or inferring states of the system, a component, a module, the environment, and/or users (or devices associated with the users) from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with dynamically mitigating a DDoS attack) may employ various artificial intelligence-based schemes for carrying out various aspects thereof. For example, a process for determining a priority of various devices connecting to an identified website, what devices should have a deny access flag automatically set to "no," when one or more devices should have a temporary, time-based code revoked (even if the time has not expired), how long to restrict access to devices that do not have an embedded token, and so on may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to prognose or infer an action that should be employed to determine what connections should be provided a secure shell, which connections should be disabled, which connections should be enabled during a DDoS attack, and so on. In the case of mitigation of DDoS attacks, for example, attributes may be known devices that include an embedded code and devices that do not include a code and the classes may be identification of a trigger event (e.g., a DDoS attack).

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing device behavior (e.g., based on the device's URL code or other identifier), by receiving extrinsic information, and so on). For example, SVM's may be configured through a learning or training phase within a classifier constructor and feature selection module. Thus, a classifier(s) may be used to automatically learn and perform a number of functions, including but not limited to determining whether a device repeatedly attempts to connect to the identified website, whether more than a threshold number of devices are attempting to access the identified website at substantially the same time, and so forth. The criteria may include, but is not limited to, historical information, current information, event attributes, and so forth.

Additionally or alternatively, an implementation scheme (e.g., a rule, a policy, and so on) may be applied to control and/or regulate whether access to an identified website through a secure connection should be enabled or disabled. In some implementations, based upon a predefined criterion, the rules-based implementation may automatically and/or dynamically interpret attributes associated with each connection. In response thereto, the rule-based implementation may automatically interpret and carry out functions associated with the connections by employing a predefined and/or programmed rule(s) based upon any desired criteria.

Methods that may be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 6:
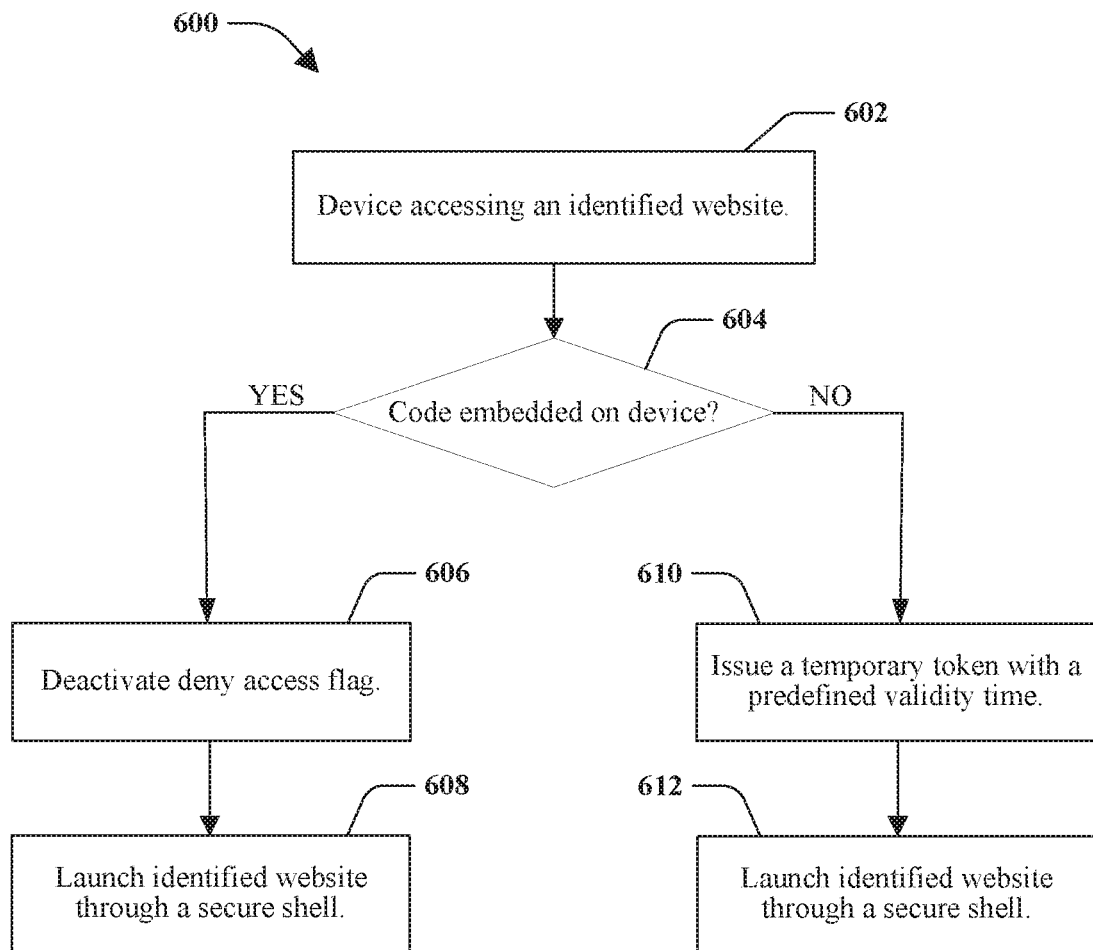
FIG. 6 illustrates an example, non-limiting method for mitigation of distributed denial of service attacks, according to an aspect.

FIG. 6 illustrates an example, non-limiting method 600 for mitigation of distributed denial of service attacks, according to an implementation. The method 600 in FIG. 6 may be implemented using, for example, any of the systems, such as the system 200 (of FIG. 2), described herein.

The method 600 starts, at 602, when a device is attempting to access an online session of an identified website. Based on this access, at 604, a determination is made whether a code is embedded on the device (e.g., using the code verification manager 206). The code is issued during an authentication session between the device and the identified website. Thus, the code is linked to the identified website. According to an implementation, the code is a digital certificate issued during a registration process with the identified website. According to another implementation, the code is a text file issued during the registration process with the identified website. In another implementation, as illustrated in FIG. 1, the code would be a key that is a unique hexadecimal number. In other implementations, the code may be a hash key, a digital certificate, a hexa-decimal number, and so on.

If the determination at 604 is that a code is embedded on the device ("YES"), at 606, a deny access flag for the identified website is deactivated for the device (e.g., using the access manager 208). At 608, the identified website is through a secure shell between the device and the identified website (e.g., using the connection manager 210).

Alternatively, if the determination at 604 is that a code is not embedded on the device ("NO"), at 610 a temporary token is issued to the device (e.g., using the code manager 302). The temporary token may have a predefined validity time during which the device may access the identified website. At 612, the identified website is launched through a secure shell during the predefined validity time (e.g., using the connection manager 210). After expiration of the predefined validity time, the secure shell is disabled and the device does not have access to the identified website.

If desired, the device may reconnect and the method continues at 602 and proceeds through 604. It is to be understood that reconnection to the website by a device that does not have an embedded token (as well as devices that do have an embedded code) may be recursive or performed a number of times.

Figure 7:
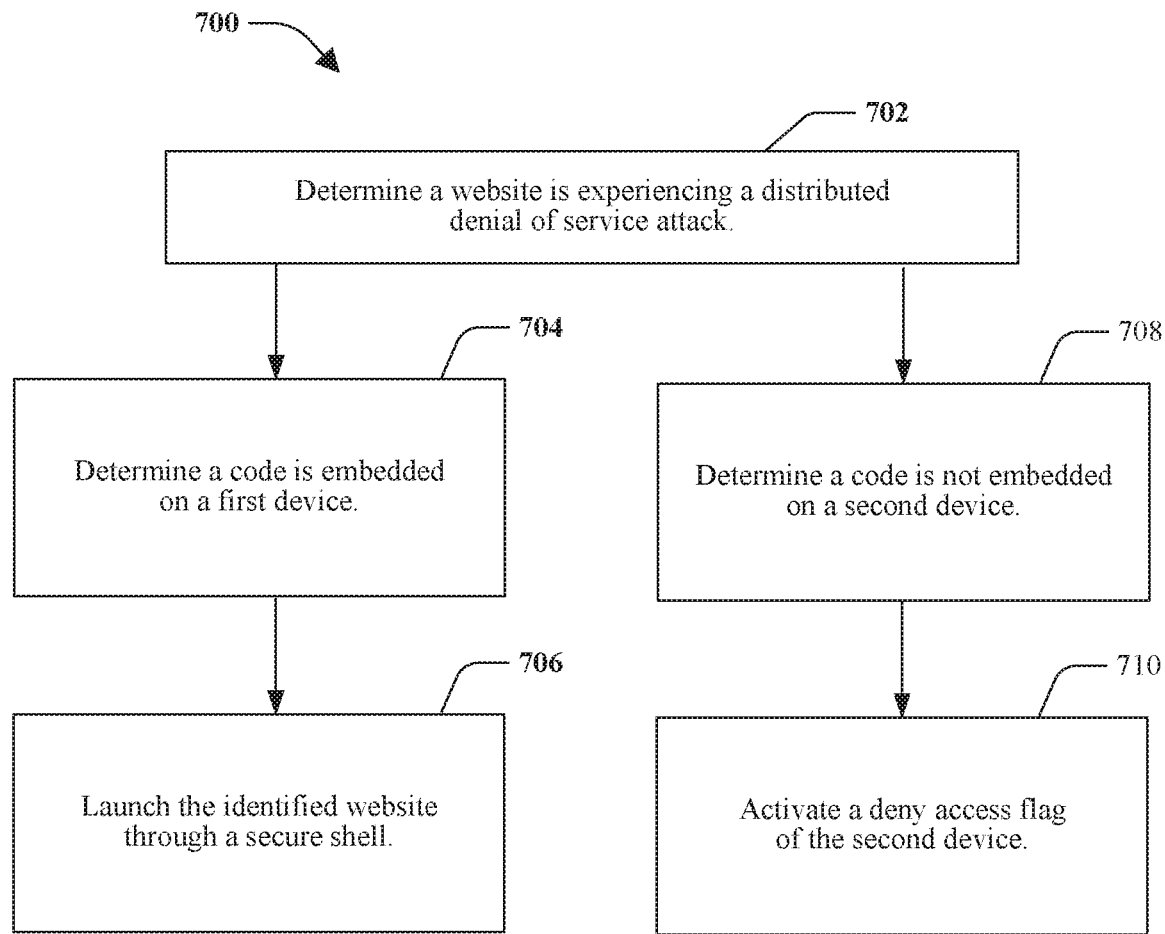
FIG. 7 illustrates an example, non-limiting method for selectively allowing access to an identified website during a distributed denial of service attack.

FIG. 7 illustrates an example, non-limiting method 700 for selectively allowing access to an identified website during a distributed denial of service attack. The method 700 starts at 702 when it is determined that an identified website is undergoing a DDoS attack. The determination of the attack may be based on observing a number of device accessing and/or attempting to access the identified website. Additionally or alternatively, the determination may be made based on a determination that a single device (or multiple devices) are attempting to access the identified website a large number of times during an identified time frame.

At 704, a determination is made that a code linked to the identified website is embedded on a first device. The code may be installed on the first device during a registration process with the identified website. Thus, the first device comprises an identification of a user independently verified by the identified website. The first device is accessing an online session of the identified website through a secure shell during the DDoS attack. The secure shell is a secure communication channel between the first device and the identified website. During the connection, the website server may update the server address (IP/DNS) to the device. This update may occur through a secure push model, for example. Based on this determination, the identified website is launched through a secure shell, at 706. During the DDoS attack, the first device continues to access the identified website. Therefore, there is no disruption of service to the first device.

Additionally, at 708, a determination is made that a code linked to the identified website is not installed on a second device. The second device is accessing another online session of the identified website during the DDoS attack. The secure shell is a secure communication channel between the second device and the identified website. Thus, the second device comprises an identification of an unverified user. For example, the second device may be accessing the website through a secure shell utilizing a temporary access code. Based on the determination that the DDoS attack is in process, a deny flag of the second device is activated, at 710. The activation of the deny access flag terminates the access by the second device through the secure shell. Accordingly, the second device is prevented access to the identified website during the DDoS attack.

The code issued to the first device and subsequent devices may be respective digital certificates. In some implementations, the code may be a text file. In other implementations, the code may be security token, and so on.

As discussed herein, the various aspects help mitigate DDoS attacks and may help ensure that trusted devices (e.g., trusted users, customers) may access the website or servers even during an ongoing DDoS attack. Thus, known customers may benefit, as these customers are able to access services, even while the service provider is under attack.

Figure 8:
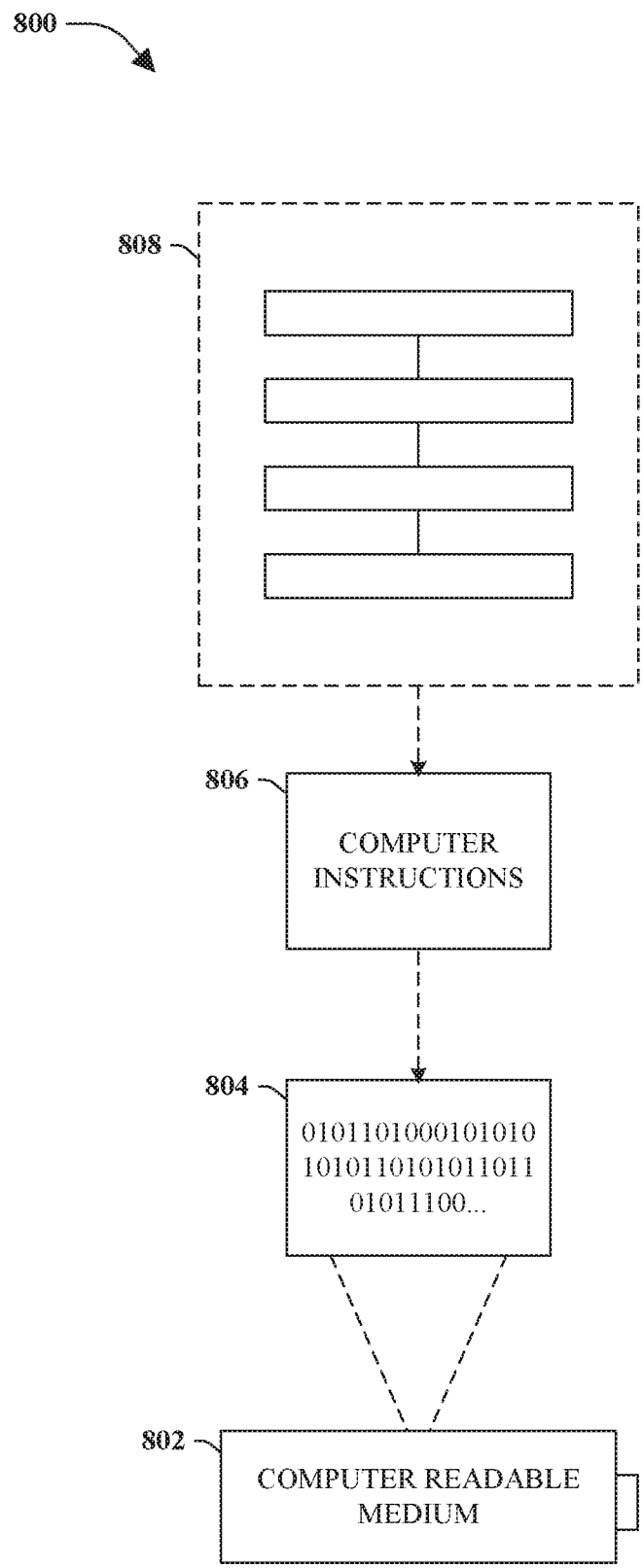
FIG. 8 illustrates an example, non-limiting computer-readable medium or computer-readable device including processor-executable instructions configured to embody one or more of the aspects set forth herein.

One or more implementations include a computer-readable medium including microprocessor or processor-executable instructions configured to implement one or more embodiments presented herein. As discussed herein the various aspects enable distributed denial of service attack mitigation. An embodiment of a computer-readable medium or a computer-readable device devised in these ways is illustrated in FIG. 8, wherein an implementation 800 includes a computer-readable medium 802, such as a CD-R, DVD-R, flash drive, a platter of a hard disk drive, and so forth, on which is encoded computer-readable data 804. The computer-readable data 804, such as binary data including a plurality of zero's and one's as illustrated, in turn includes a set of computer instructions 806 configured to operate according to one or more of the principles set forth herein.

In the illustrated embodiment 800, the set of computer instructions 806 (e.g., processor-executable computer instructions) may be configured to perform a method 808, such as the method 600 of FIG. 6 and/or the method 700 of FIG. 7, for example. In another embodiment, the set of computer instructions 806 may be configured to implement a system, such as the system 300 of FIG. 3 and/or the system 500 of FIG. 5, for example. Many such computer-readable media may be devised by those of ordinary skill in the art that are configured to operate in accordance with the techniques presented herein.

As used in this application, the terms "component," "module," "system," "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 8 and the following discussion provide a description of a suitable computing environment to implement embodiments of one or more of the aspects set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Figure 9:
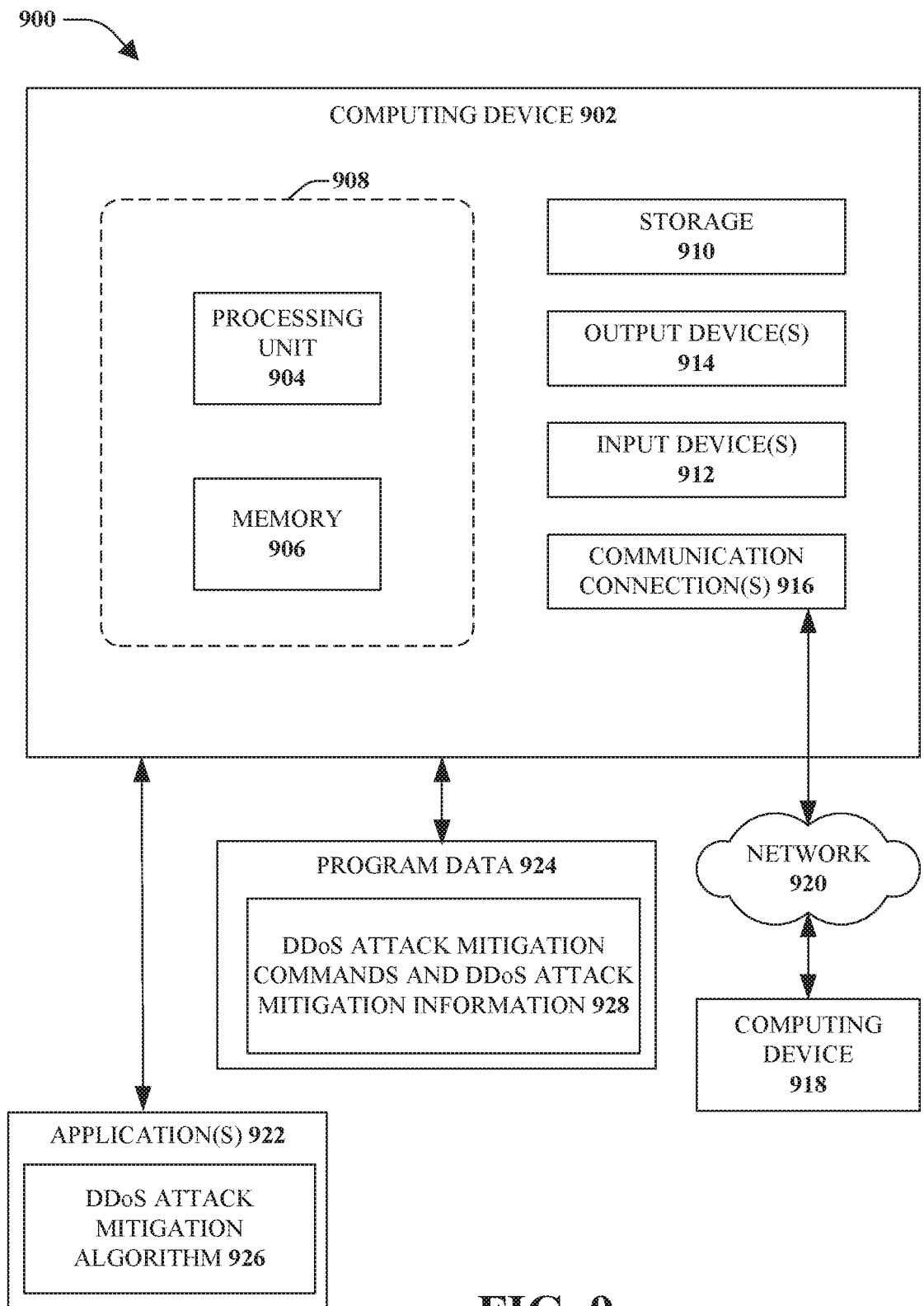
FIG. 9 illustrates an example, non-limiting computing environment where one or more of the aspects set forth herein are implemented, according to one or more aspects.

FIG. 9 illustrates a system 900 that may include a computing device 902 configured to implement one or more embodiments provided herein. In one configuration, the computing device 902 may include at least one processing unit 904 and at least one memory 906. Depending on the exact configuration and type of computing device, the at least one memory 906 may be volatile, such as RAM, non-volatile, such as ROM, flash memory, etc., or a combination thereof. This configuration is illustrated in FIG. 9 by dashed line 908.

In other embodiments, the computing device 902 may include additional features or functionality. For example, the computing device 902 may include additional storage such as removable storage or non-removable storage, including, but not limited to, magnetic storage, optical storage, etc. Such additional storage is illustrated in FIG. 9 by storage 910. In one or more embodiments, computer readable instructions to implement one or more embodiments provided herein are in the storage 910. The storage 910 may store other computer readable instructions to implement an operating system, an application program, etc. Computer readable instructions may be loaded in the at least one memory 906 for execution by the at least one processing unit 904, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 902 may include input device(s) 912 such as keyboard, mouse, pen, voice input device, touch input device, infrared cameras, video input devices, or any other input device. According to some implementations, the input device(s) 912 (as well as other interface components discussed herein) may provide a graphical user interface (GUI), a command line interface, a speech interface, Natural Language text interface, and the like. For example, a Graphical User Interface (GUI) may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or Application Program Interface (API). In addition, the command line interface may be employed in connection with hardware (e.g., video cards) and/or displays (e.g., black and white, and Video Graphics Array (EGA)) with limited graphic support, and/or low bandwidth communication channels.

Output device(s) 914 such as one or more displays, speakers, printers, or any other output device may be included with the computing device 902. The input device(s) 912 and the output device(s) 914 may be connected to the computing device 902 via a wired connection, wireless connection, or any combination thereof. In one or more embodiments, an input device or an output device from another computing device may be used as the input device(s) 912 and/or the output device(s) 914 for the computing device 902. Further, the computing device 902 may include communication connection(s) 916 to facilitate communications with one or more other devices, illustrated as a computing device 918 coupled over a network 920.

One or more applications 922 and/or program data 924 may be accessible by the computing device 902. According to some implementations, the application(s) 922 and/or program data 924 are included, at least in part, in the computing device 902. The application(s) 922 may include a DDoS attack mitigation algorithm 926 that is arranged to perform the functions as described herein including those described with respect to the system 300 of FIG. 3. The program data 924 may include DDoS attack mitigation commands and DDoS attack mitigation information 928 that may be useful for operation with the various aspects as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
a processor coupled to a memory that stores instructions, that when executed by the processor, cause the processor to:
determine whether a unique code is present on a device attempting to access an online session of a website, wherein the unique code is linked to the website, and the device is associated with a validated user of the website; and
launch the website through a secure communication channel when the unique code is present on the device.

2. The system of claim 1, wherein the instructions further cause the processor to:
issue a temporary code with a predetermined validity time when the unique code is absent from the device; and
launch the website through a second secure communication channel.

3. The system of claim 2, wherein the instructions further cause the processor to disable the second secure communication channel between the device and the website after expiration of the validity time.

4. The system of claim 2, wherein the instructions further cause the processor to:
detect a denial of service attack; and
disable the second secure communication channel between the device and the website in response to the denial of service attack.

5. The system of claim 1, wherein the instructions further cause the processor to detect a denial of service attack associated with the website.

6. The system of claim 5, wherein the instructions further cause the processor to detect the denial of service attack based on a result of a comparison of a number of hits to the website to an expected number of hits determined from historical data.

7. The system of claim 5, wherein the instructions further comprise maintaining the secure communication channel during the denial of service attack.

8. The system of claim 5, wherein the instructions further cause the processor to:
   determine that the unique code is absent from a second device attempting to access the online session of the website during the denial of service attack; and
   deny the second device access to the website.

9. The system of claim 5, wherein the instructions further cause the processor to:
   determine that the unique code is present on a second device attempting to access the online session of the website during the denial of service attack; and
   launch the website through a second secure communication channel.

10. The system of claim 1, wherein the unique code is issued during a registration process with the website.

11. A method, comprising:
    determining whether a unique code is present on a device attempting to access an online session of a website, wherein the unique code is linked to the website, and the device is associated with a validated user of the website; and
    launching the website through a secure communication channel when the unique code is present on the device.

12. The method of claim 11, further comprising:
    issuing a temporary code with a predetermined validity time when the unique code is absent from the device; and
    launching the website through a second secure communication channel.

13. The method of claim 12, further comprising disabling the second secure communication channel between the device and the website after expiration of the validity time.

14. The method of claim 12, further comprising:
    detecting a denial of service attack; and
    disabling the second secure communication channel between the device and the website in response to the denial of service attack.

15. The method of claim 11, further comprising detecting a denial of service attack.

16. The method of claim 15, further comprising:
    determining that the unique code is absent from a second device attempting to access the online session of the website; and
    denying access to the website.

17. The method of claim 15, further comprising:
    determining that the unique code is present on a second device attempting to access the online session of the website; and
    launching the website through a second secure communication channel.

18. A computer-readable storage device that stores executable instructions that, in response to execution, cause a system comprising a processor to perform operations, comprising:
    determining whether a unique token is present on a device attempting to access a website, wherein the unique token is linked to the website, and the device is associated with a validated user of the website; and
    launching the website through a secure communication channel when the unique token is present on the device.

19. The computer-readable storage device of claim 18, the operations further comprising:
    issuing a temporary token with a predetermined validity time when the unique token is absent from the device; and
    launching the website through a second secure communication channel.

20. The computer-readable storage device of claim 19, the operations further comprising:
    detecting a denial of service attack; and
    disabling the second secure communication channel in response to the denial of service attack.

* * * * *